United States Patent [19]

van der Wal et al.

[11] Patent Number: 5,313,455
[45] Date of Patent: May 17, 1994

[54] TRANSMISSION SYSTEM WITH RECORDING OF UNTRANSMITTED PACKETS

[75] Inventors: Jacob C. van der Wal, Delft; Dick Brandt, Voorburg; Gerrit J. van Loo, Delft, all of Netherlands

[73] Assignee: Koninklijke PTT Nederland N.V., AC Groningen, Netherlands

[21] Appl. No.: 960,937

[22] Filed: Oct. 14, 1992

Related U.S. Application Data

[63] Continuation-in-part of Ser. No. 687,338, Apr. 18, 1991, abandoned.

[30] Foreign Application Priority Data

Apr. 23, 1990 [NL] Netherlands ............... 9000962

[51] Int. Cl.$^5$ ................................................ H04J 3/14
[52] U.S. Cl. ........................................ 370/13; 370/17; 370/60
[58] Field of Search ............... 370/60, 60.1, 84, 94.1, 370/94.2, 94.3, 13, 17; 340/825.06

[56] References Cited

U.S. PATENT DOCUMENTS

| | | | |
|---|---|---|---|
| 4,993,024 | 2/1991 | Quinguis et al. | 370/94.1 |
| 5,007,043 | 4/1991 | Van Den Dool et al. | 370/60 |
| 5,014,260 | 5/1991 | Wicklund | 370/13 |
| 5,117,417 | 5/1992 | Danner | 370/13 |
| 5,119,364 | 6/1992 | Thiebaut et al. | 370/13 |
| 5,128,924 | 7/1992 | LeBihan | 370/13 |

Primary Examiner—Douglas W. Olms
Assistant Examiner—Hassan Kizou
Attorney, Agent, or Firm—Frishauf, Holtz, Goodman & Woodward

[57] ABSTRACT

Packets transmitted in an automatic packet transmission system each have an information part and a header part. The heater contains virtual channel information (vci), identifying the virtual transmission channel and/or the group of virtual transmission channels via which the packet is being transmitted. The transmitted system at a junction point comprises 94 access control system including a counter-and-threshold access control device (3) controlling a switch (2) for granting or refusing packets access to the downstream part of the transmission system, depending on the arrival rate of incoming of packets of the respective packet types identified by their virtual channel information. An error reporting device (4) records per vci the arrival rate of packets which are refused access downstream when a first threshold arrival rate is exceeded. Arrival rates and arrival rate thresholds are measured by a "leaky bucket" method for each packet type. When the arrival rate of packets which are refused downstream access exceeds a second threshold value the error reporting device prevents excessive processing of access refusals in overloaded virtual channels and sends an error message for attracting the attention of supervisors or users of the transmission system.

9 Claims, 3 Drawing Sheets

TRANSMISSION SYSTEM WITH RECORDING OF UNTRANSMITTED PACKETS

CROSS REFERENCES TO RELATED PATENT APPLICATIONS

This application is a continuation-in-part of Ser. No. 07/687,338, filed Apr. 18, 1991 now abandoned. U.S. Ser. No. 07/472,349, filed Jan. 30, 1990 [JC van der Wal and F. van der Dool], U.S. Pat. No. 5,007,043; other related patent applications U.S. Ser. No. 07/573,446, filed Aug. 24, 1990, abandoned and U.S. Ser. No. 07/729,635, filed Jul. 15, 1991, U.S. Pat. No. 5,224,092 and U.S. Ser. No. 07/591,699, filed Oct. 2, 1990, U.S. Pat. No. 5,224,091.

BACKGROUND OF THE INVENTION

1. Field of the Invention

The invention relates to a transmission system for transmitting packets which comprise an information word group and a control word group (header), the control word group comprising an identification of the packet type such as an identification of the virtual transmission channel and/or of the group of virtual transmission channels via which the packet is being transmitted, which transmission system comprises access control means for granting or refusing said packets access to the part of the transmission system situated downstream of the access control means, depending on the incoming volume of packets.

2. Prior Art

Within the field of ATM (Asynchronous Transfer Mode), such a transmission system is generally known. Inter alia, such a transmission system has been described in the reference mentioned under C.

In the known transmission systems of the abovementioned type, packets (data cells) are there.fore admitted, or not admitted, to the downstream part of the transmission system on the basis of, for example, the mean arrival frequency of said packets or on the basis of another criterion. Preferably, the transmission of packets per transmission channel (or group of channels) is monitored, a certain limit therefore being imposed per transmission channel (or group) on the number of packets which, for example, are transmitted per unit of time to the downstream system. A drawback of the known transmission systems is that, as soon as the number of packets (for example of a particular sort, a particular channel) becomes too large, the packets are discarded. Said discarding of said packets is, however, entirely to be approved since (normally) it could have been prevented by the provider of the packets, the user of the relevant transmission channel: the user must not, for example, exceed a particular maximum frequency, on pain of losing packets. A drawback of the known transmission systems of the type mentioned is, however, that there is in fact no control at all on the discarding of packets. The transgression of the maximum permitted packet input frequency may in fact be the consequence either of a deliberate attempt by the user to transmit more packets per unit time than he is permitted or of a lack of checking on his part on the possible transgression of the maximum. It may also be important to know if a transgression is occasional and of little significance or is frequent and appreciable. Especially if the transgression is appreciable and prolonged, there is a very real chance that the transgression is the consequence of a technical fault in the user's equipment or in the equipment of the transmission system manager.

B. SUMMARY OF THE INVENTION

The invention provides the fulfilment of the need, resulting from the above considerations, to be able to form a picture of the nature and extent of the packets not admitted. The invention provides a transmission system of the type mentioned under A, which is characterized by an error reporting device for recording (registration), processing and reporting the arrival rate per packet type of the packets not admitted, by the access control means, to the downstream part of the transmission system. It will usually not be desirable to signal directly the relevant packet type and (possibly) the number of transgressions for every excess input of packets, however small, but preference will be given to signalling said excess input only if it really begins to take on serious forms. In order, therefore, to prevent an excess of error reports, provision is preferably further made that the error reporting device delivers an error report as soon as the arrival rate of packets not admitted of a packet type exceeds a particular threshold value. Transgression of the threshold value therefore gives rise to an error report with the indication that packets of the same type as the packet which produced the transgression has to be assigned to the "notorious" transgressors. If the type identification indicates the virtual transmission channel of said packets, the error reporting system therefore indicates that the virtual transmission channel is notoriously overloaded, at least that an appreciably greater rate of arrival of packets is presented via said channel than can be admitted by the access control means (on the basis of the established limit(s)). After being warned by means of the error reporting system, the system manager can advise the relevant user of the notorious excess input and possibly take further measures. It is also possible to offer the error report (also) directly to the relevant user. As a result of setting the threshold value mentioned lower or higher, the error reporting device will signal a transgression of said threshold value sooner or later and will therefore deliver the error report to the system manager and/or the relevant system user for a less or more serious degree of excess input. In the case of a notorious excess input of packets of a particular type (which are then never transmitted by the access control means), in order to prevent the non-transmission thereof having to be continuously processed by the error reporting device, provision is made according to a more refined development of the invention that the error reporting device ceases to record the relevant packets not transmitted if the threshold value mentioned is exceeded. Only after the error reporting device for said channel has been "reset", is recording of said packet type (insofar as not transmitted) resumed again.

A preferred embodiment of the transmission system according to the invention provides that the error reporting device comprises a first recording device for recording, under the control of control means and the access control means mentioned, the packet types of the packets not admitted to the downstream transmission system insofar as such a packet type has not already been recorded in said first recording device, and for delivering a signal after such a recording to the control means to prevent multiple recording of said packet type in said first recording device. At the same time, provision can furthermore be made that the error reporting device comprises at least one counting device for maintaining, under the control of the control means and the access control means for each packet type a counter value which is altered in a particular direction if a packet of the relevant packet type is not transmitted by the access control means and which is altered in the opposite direction in proportion to the time lapse. At the same time, provision is preferably made that, if a packet is not admitted, such a counting device compares the counter value of the relevant packet type with a threshold value and emits a signal if said threshold value is exceeded. The counting device is preferably a "leaky bucket" device whose operation is known per se, inter alia, from the references under C. Moreover, provision can be made in said preferred embodiment that the error reporting device comprises a second recording device for recording, under the control of the counting device and of the control means, the packet type of the packets which cause the threshold value to be exceeded, insofar as such a packet type has not already been recorded in said second recording device, and for emitting, after such a recording, a signal to the control means to prevent multiple recording of said packet type in the second recording device. Finally, provision is preferably made that such a counting device is used in a time-shared manner in which, if a packet is not transmitted by the access control means, the control means mentioned set the relevant parameters, including the last counter value associated with the relevant packet type, in the counting device. Said time-shared use of the counting device (or of a number of counting devices which each maintain a counter value, relating to the same packet type, but with different parameters) achieves the result that a single, separate counting device (or even a number of counting devices) is not necessary for each packet type. In this preferred embodiment, the parameters needed to perform a counting operation are therefore always delivered by the control means. However, the operation of the time-shared use of a counting device is known per se from reference [2]. The proposed preferred embodiment will be explained in more detail below.

C. REFERENCES

Kowalk, W. and Lehnert, R.
 The 'policing function' to control user access in ATM networks—definition and implementation
 ISSLS 88: Int. Symp. Subscriber Loops and Services; Proc. IEEE Sept. 88, pp 240-245
Wal, J. C. van der and Dool, F. van der
 European Patent Application 90200189.0

D. BRIEF DESCRIPTION OF THE DRAWINGS

E. DESCRIPTION OF THE PREFERRED EMBODIMENTS

Figure 1:
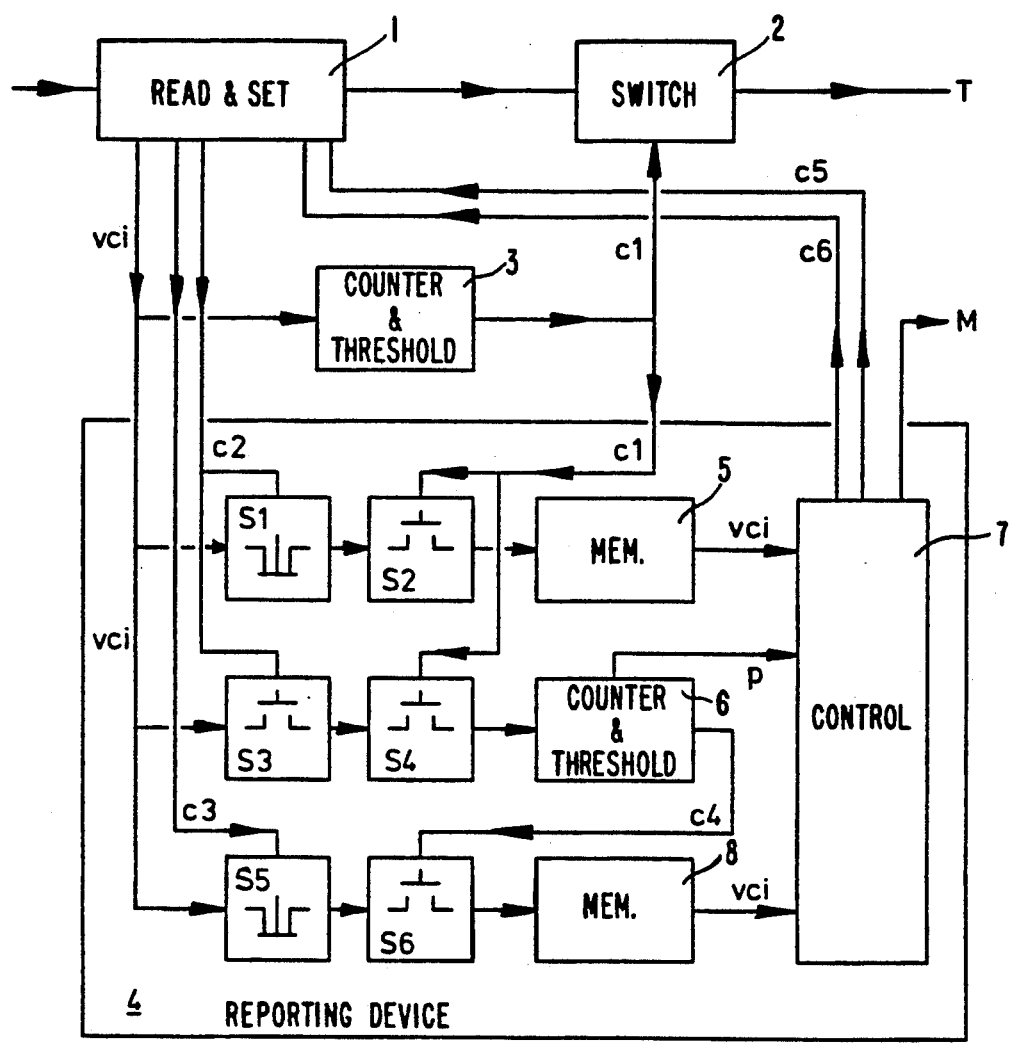
FIG. 1 shows a block diagram of a exemplary embodiment of the invention.

In FIG. 1 a data packet (data cell) is fed to a read-out device 1 in which the packet's control word group ('header') is read out. The control word group comprises a type identification of said packet relating to the virtual transmission channel ('vci') via which the packet has to be transmitted.

The read-out device 1 emits, on the basis of the vci and of related parameters, control signals c2 and c3 for the purpose of controlling an error reporting device 4. Said parameters are controllable by 'feed back' control signals c5 and c6 from that error reporting device 4.

Said signals c2 and c3 are intended to prevent the situation that, in the event of an excess input of data packets on a particular virtual channel, that input will again and again be processed and reported by error reporting device 4 on the arrival of each subsequent packet in said channel. The control signals c2 and c3 bring about an efficient error processing and signalling.

Said parameters which control the signals c2 and c3 are set by means of said control signals c5 and c6, originated from a control unit 7 of the error reporting device 4.

After the vci has been read out, an access control device 3 is activated. An exemplary embodiment of such a device has been described in detail in reference [2]. The device 3 maintains for each virtual channel a counter value, which is updated at the arrival of a data packet. After reading out its vci the counter value of that channel is updated by increasing the counter value with a certain fixed value and decreasing that value with a value which corresponds with the time elapsed since the last data packet with the same vci. After that, the updated counter value is compared with a decision threshold: only if the threshold is not exceeded, a switching device 2 is informed, by means of a control signal c1, that the packet can be switched through to the downstream network T; if not, the packet will be discarded.

According to the invention, said error reporting device 4 processes and reports any transgressions of the threshold values for the various virtual channels in order to obtain an insight into the frequency and seriousness of those transgressions and to generate an error report signal or message if the transgressions take on a very serious form. The error reporting device 4 is formed, to an important extent, by a counting device 6 which functions in a similar way to the counting device 3. Both devices may be formed, for example, by a so-called "leaky bucket" device. In such a device, a counter value is increased as soon as a particular event, such as the arrival of a packet, occurs, whereas the counter value is decreased again in proportion to the time, the counter value always being compared with a particular threshold value and a particular error signal being emitted if said threshold value is exceeded. The error reporting device 4 furthermore comprises a control device 7, a microprocessor, which provides for the setting of the relevant control parameters and, furthermore, generates an error report message M in the event of a very serious transgression. The error report message can be printed out by any suitable printer coupled to receive the error report message M. The error reporting device 4 furthermore comprises two vci memories 5 and 8, and also six switching devices S1 ... S6.

If a packet appears at the input of the read-out device 1 and said packet causes the relevant threshold value to be exceeded in the counting device 3, as a result of which the counting device 3 delivers to the switching device 2 a control signal c1 that said packet must not be transmitted, said control signal c1 is also fed to the switching device S2, as a consequence of which the vci of the packet is written, via switching device S1 and switching device S2, into the memory device 5, which is read out by the control device 7. Said control device 7 then supplies the read-out device 1 said control signal c5, as a result of which a parameter is set in said read-out device 1 indicating that whenever new packets arrive having the same vci as the packet which caused the threshold value to be exceeded in the counting device 3, said control signal c2 must be provided from said read-out device 1 to the switches S1 and S3. The consequence of said setting effected in the read-out device 1 from the control device 7 is that, if a packet then appears which has the same vci as the packet which caused the threshold value to be exceeded in the counting device 3, the switching device S1 is controlled by mean of the control signal c2 in a manner such that said vci is not transmitted again to the memory device 5, despite the fact that the switching device S2 will in fact be reactivated (closed) in that case by means of the control signal c1. If a packet having that vci appears, the control signal c2 will, in addition, activate the switching device S3, as a result of which the counter value of the counting device 6 for the vci will be updated since the control signal c1 also activates the switching device S4 if the threshold value is exceeded in the counting device 3. The updated counter value in the counting device 6 is then compared with a (second) threshold value, the status remaining unchanged if said threshold value is not exceeded. However, if the threshold value in counting device 6 is in fact exceeded as a consequence of the arrival of a packet, said device 6 delivers a control signal c4 to the switching device S6, which is then activated. As a consequence of this, the vci of the packet is now written into the memory device 8 from the read-out device 1 and then transmitted to the control device 7. The control device 7 now transmits an error report message M, as a result of which the system manager is informed that the input of packets of the relevant vci so often causes the threshold value to be exceeded in the counting device 3 that (even) in the counting device 6 the threshold value set therein is exceeded, which indicates that the excess input of packets of the same vci is so large that it has to be signalled since intervention will presumably be necessary. In order to prevent said reports being repeated as long as said notorious transgression of the input limit continues, a control signal c6 is also transmitted to the read-out device 1 by the control device 7, as a result of which a parameter is set in said read-out device 1 which is such that, if packets of said the same vci present themselves thereafter, the read-out device I sends a control signal c3 to the switching device S5, as a result of which said switching device S5 prevents said vci being written into the memory device 8 again.

About said control signals c1..c6 and said parameters to be set in the read-out device 1, it is noted that those signals and parameters can have two possible values: 0 or 1. If the threshold in device 3 is not transgressed by the counter value, c1 will be 0, and the packet will be transmitted by switch 2; as soon as the counter value exceeds the threshold, the value of c1 becomes 1, which value will open ('disable') switching device 2 and will close ('enable') switching devices S2 and S4. As soon as the vci of the 'transgressing' virtual channel has been written into memory 5, which is read-out by the control device 7, control device 7 transmits said control signal c5 with a value 1 to the read-out device 1, in which said signal c5 sets a paramater (p5) to the same value: p5=1. If a new packet with the same vci arrives at the read-out device 1, said read-out device detects —in a 'look-up table'—that parameter p5 for that vci has got the value 1, and will transmit a signal c2 with the value 1 to the switching devices S1 and S3. Signal c2 (=1) will activate S1 and S3, resulting in opening ('disabling') S1 and closing ('enabling') S3. The effect is that on further transgressions of the threshold in device 3, causing again that c1 gets the value 1, the relevant vci will not be written again in the memory 5. As, in that case, switching devices S3 and S4 will be closed —c1=1 and c2=1—repetition of said transgression will increase the transgression counter value of counter device 6. If said counter value of device 6 —after a severe, transgression of the threshold of device 3—exceeds said threshold of device 6 a parameter p is set to the value 1 —indicating that there is a severe packet overload—which parameter p is read-out by control device 7 and causing that device 7 transmits control signal c6 with value 1 to read-out device 1. Also device 6 transmits control signal c4 with the value 1 to the switching device S6, causing closing ('enabling') of that device. By closing of device S6, the vci will be written into memory 8, which will be read out by control device 7. After detecting in memory 8 said vci, control device 7 will transmit an error message M to the monitor of a control centre. In read-out device 1 control signal c6=1 sets a parameter (p6) with the same value 1. On the arrival of again new packets with the same vci, read-out device 1 finds parameter p6=1 and transmits control signal c3 having the same value 1 to the switching device S5. Signal c3=1 causes opening ('disabling') of S5, thus preventing unneccesary multiple registration into memory 8. As soon as the transgressions of the thresholds in device 6 and device 3 have come to an end, the relevant vci's will be deleted from the memories 5 and 8, the counter value in device 6 will be reset to 0, the parameters p, p(5) and p(6) will be reset to 0 and also the control signals c1 to c6 will get the value 0 again.

It is pointed out that the abovementioned switching devices, together with the devices they operate, if constructed with modern electronic components, form a single entity with one another, i.e. S1, S2 and memory device 5, or S3, S4 and counting device 6, or S5, S6 and memory device 8. The control signals c1, c2, c3 and c4 are then applied to the relevant "enable' or "disable" terminals. All this is elaborated in FIG. 2. In this figure, the devices S1, S2 and 5 have been replaced by a memory device 9, as have the devices S3, S4 and 6 by a "leaky bucket" device 10 and the devices S5, S6 and 8 by a memory device 11. The respective control siqnals c1 . . . c4 are connected to the relevant "enable" or "disable" terminals, indicated by "en." or "dis.", respectively.

Figure 2:
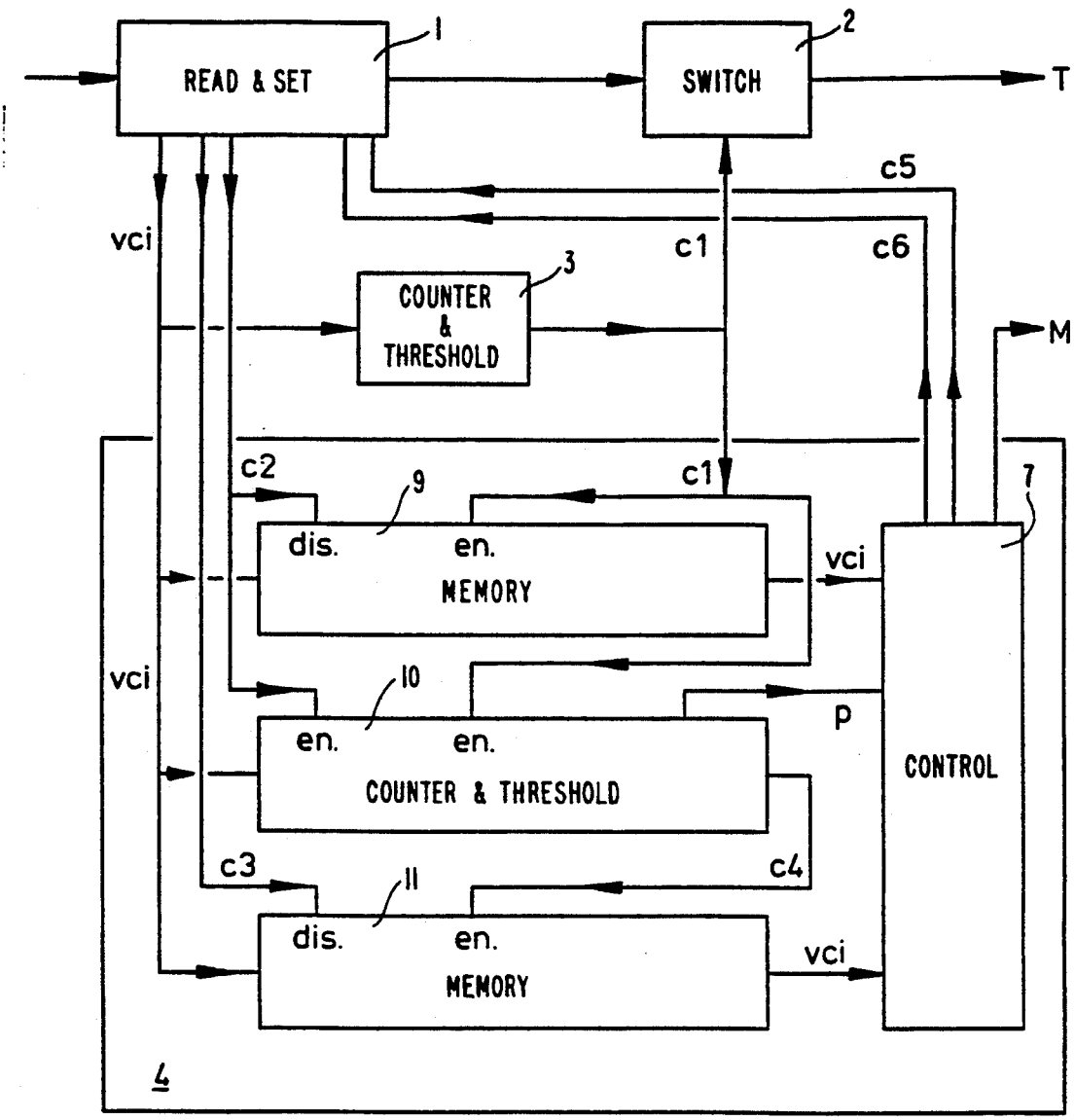
FIG. 2 shows a block diagram of the exemplary embodiment of FIG. 1, comprising integrated components.
Figure 3:
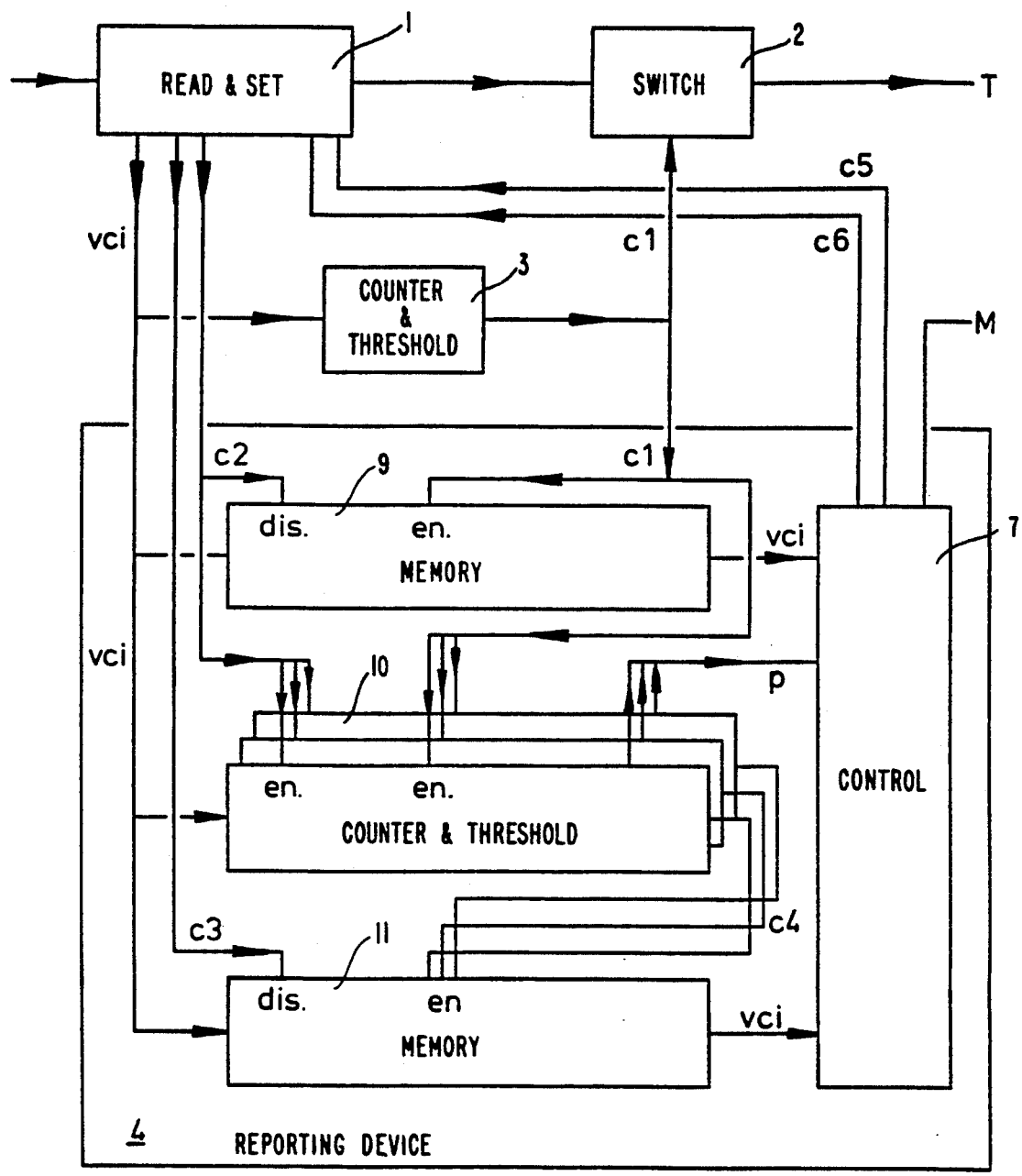
FIG. 3 shows a block diagram of the exemplary embodiment of FIG. 2, comprising a more sophisticated reporting device.

Finally, it is pointed out that the counting device 6 or 10 is used in a time-shared manner. Whenever a packet is refused by the access device 3, the control device 7 "loads" the parameters p associated with the relevant channel, with which the counting operation is then to be carried out, into the counting device 6 or 10. In the case of a subsequent packet which is not transmitted, parameters associated with the channel of said packet are then again loaded, etc. Although only one counting device 6 or 10 is indicated in FIGS. 1 and 2 for the sake of a clear understanding, it is also possible, as indicated in FIG. 3, to provide that not one, but several counter values are maintained for each channel (one counter value for each counting device 6 or 10) with different parameters, of which, for example, one relates to the short-term average and a second to the long-term average (these can be set by the parameter which controls the degree of reduction of the counter value as a function of time) and of which the threshold values may therefore be different. The different counting devices (three are indicated in FIG. 3) can then, for example, separately give an "enable" signal to the memory device 11, as a result of which said memory device 11 is "enabled" (apart from any "disabling" by means of c3) if one of the counting devices signals transgression of the relevant threshold value. It is also possible to present the "enable" signals to the memory device 11 via a multiple OR gate (or, if desired, AND gate). The use of such a multiple counting device is known as such from the U.S. patent application U.S. Ser. No. 07/573,446 [Brandt], filed by the applicant on August 24, 1990; the difference is, that application there is a data packet monitoring system in which the counting device 3 is such a multiple counting device.

Below there is shown an example of a computer program, executing the functions of the various devices of the embodiment of the FIGS. 1 and 2. This program is available from applicant for demonstration of the present invention.

```
100 REM * * * * * TRANSGRESSION MONITOR * * * * *
110 CLS
        In the READ & SET DEVICE 1 the vci is read from the header
        of an arriving data packet and the values of control
        signals c2 and c3 are derived from de parameters p5 and p6
        for that vci
120 REM **********READ & SET DEVICE 1**********
130 V$=INKEY$: REM READ HEADER VCI
140 IF V$=" " GOTO 130
150 VCI=VAL(V$): REM VCI=VIRTUAL CHANNEL IDENTIFIER
160 V$=MID$(STR$(VCI),2)
170 C2=P5(VCI):C3=P6(VCI)
        In the COUNTER & THRESHOLD DEVICE 3 the counter is
        incremented and decremented and compared with a threshold.
        On transgression of the threshold, the packet is refused to
        the transmission network T and cl is set to 1:
180 REM **********COUNTER & THRESHOLD DEVICE 3**********
190 TN=VAL(RIGHT$(TIME$,2)): REM TN=TIME NOW
200 CV(3,VCI)=CV(3,VCI)+1: REM INCREASE COUNTER VALUE DEVICE 3
210 DT3=TN-TL(3,VCI): IF DT3<0 THEN DT3=DT3+60: REM DT3=DELTA
TIME DEVICE 3
220 CV(3,VCI)=CV(3,VCI)-DT3*1: REM DECREASE COUNTER VALUE
230 IF CV(3,VCI)<0 THEN CV(3,VCI)=0
240 THR3=10: REM THR3=THRESHOLD DEVICE 3
250 IF CV(3,VCI)<=THR3 THEN C1=0: M$="SWITCH THROUGH TO TRANS-
MISSION NETWORK, CHANNEL"+STR$(VCI)
260 IF CV(3,VCI)>THR3 THEN C1=1: REM TRANSGRESSION OF THRESHOLD
THR3; TRANSMISSION REFUSED
        If c2=0 and c1=1 the vci is written into MEMORY DEVICE 5.
        If c1 has become 0 again, the vci will be removed:
270 REM **********MEMORY DEVICE 5**********
280 IF (C2=0) AND (C1=1) THEN X5=X5+1:M(5,X5)=VCI: GOTO 330
290 IF C1=0 THEN FOR N=1 TO X5: IF M(5,N)=VCI GOTO 310: NEXT N
300 GOTO 320
310 P5(VCI)=0:X5=X5-1:FOR M=N-1 TO X5: M(5,M)=M(5,M+1):NEXT M
320 GOTO 370
        CONTROL DEVICE 7 sets, via c5=1, in READ & SET DEVICE 1
        parameter p5 on 1:
330 REM **********CONTROL DEVICE 7**********
340 C5=1
350 P5(VCI)=C5: REM SET PARAMETER P5=1 IN READ & SET DEVICE 1
360 C5=0
        After transgression of the threshold of device 3, the
        counter of COUNTER & THRESHOLD DEVICE 6 is updated and
        compared with a threshold. On transgression this threshold,
        control signal is set to 1:
370 REM **********COUNTER & THRESHOLD DEVICE 6**********
380 IF C1=0 THEN CV(6,VCI)=0:TL(6,VCI)=TN:GOTO 400
390 CV(6,VCI)=CV(6,VCI)+1: REM INCREASE COUNTER VALUE DEVICE 6
400 DT6=TN-TL(6,VCI): IF DT6<0 THEN DT6=DT6+60: REM DT6=DELTA
TIME DEVICE 6
410 CV(6,VCI)=CV(6,VCI)-DT6*1: REM DECREASE COUNTER VALUE DEVICE 6
420 IF CV(6,VCI)0 THEN CV(6,VCI)=0
430 THR6=10: REM THR6=THRESHOLD DEVICE 6
440 IF CV(6,VCI)=0 THEN C4=0
450 IF (CV(6,VCI) 0) AND (CV(6,VCI)<=THR6) THEN C4=0: M$="NOT
SEVERE OVERLOAD CHANNEL"+STR$(VCI)
460 IF CV(6,VCI)>THR6 THEN C4=1: M$="* * SEVERE OVERLOAD
CHANNEL"+STR$(VCI)+"* *"
        If c3=0 and c4=1 the vci is written into MEMORY DEVICE 8.
        If c4 has become 0 again, the vci will be removed:
470 REM **********MEMORY DEVICE 8**********
480 P=0
490 IF (C3=0) AND (C4=1) THEN X8=X8+1:M(8,X8)=VCI: P=1:GOTO 540
500 IF C4=0 THEN FOR N=1 TO X8: IF M(8,N)=VCI GOTO 520: NEXT N
510 GOTO 530
520 P6(VCI)=0:X8=X8-1:FOR M=N-1 TO X8: M(8,M)=M(8,M+1):NEXT M
530 GOTO 580
        CONTROL DEVICE 7 sets, via c6=1, in READ & SET DEVICE 1
```

```
    parameter p6 on 1:
540 REM **********CONTROL DEVICE 7**********
550 C6=P
560 P6(VCI)=C6: REM SET PARAMETER P6=1 IN READ & SET DEVICE 1
570 C6=0
    CONTROL DEVICE 7 outputs control and warning messages; the
    warning message of lines 650-660 being message M in FIGS.
    1 and 2 and the following "PRINT " instructions being
    performed on the printer 15 shown in those figures, which may be
    located at a control center (not shown) as mentioned above:
580 REM **********MESSAGES**********
590 LOCATE 1,1:PRINT "           "
600 LOCATE 1,1:PRINT M$
610 PRINT " "
620 PRINT "Contents of MEMORY DEVICE 5 (VCIs): ";:FOR N=1 TO X5:
PRINT M(5,N);:NEXT N:PRINT "           "
630 PRINT "Contents of MEMORY DEVICE 8 (VCIs): ";:FOR N=1 TO X8:
PRINT M(8,N);:NEXT N:PRINT "           "
640 IF X8=0 THEN PRINT " " :LOCATE ,5:PRINT "           ":
PRINT "           ":GOTO 670
650 PRINT "": LOCATE ,5:PRINT "* * * WARNING * * *":PRINT
"SEVERE OVERLOAD IN CHANNEL(S):";
660 FOR N=1 TO X8: PRINT M(8,N);: NEXT N:PRINT "           "
    CONTROL DEVICE 7 sets and resets the various control
    signals and parameters, preparing the system for processing
    next packet:
670 REM **********CONTROL DEVICE 7**********
680 C1=0:              REM RESET CONTROL SIGNAL C1 IN
COUNTER & THRESHOLD DEVICE 3
690 TL(3,VCI)=TN:TL(6,VCI)=TN: REM SET LAST TIME PARAMETERS IN
READ & SET DEVICE 1
700 C2=0:C3=0:         REM RESET CONTROL SIGNALS C2 AND
C3 IN READ & SET DEVICE 1
710 C4=0:              REM RESET CONTROL SIGNAL C4 IN
COUNTER & THRESHOLD DEVICE 6
720 C5=0:C6=0:         REM RESET CONTROL SIGNALS C5 AND
CONTROL DEVICE 7
730 GOTO 120
```

We claim:

1. Transmission system for transmitting packets which comprise an information word group and a control word group, the control word group comprising an identification of the packet type by an identification information regarding the virtual transmission channel via which the packet is being transmitted, which transmission system comprises access control means for granting or refusing said packets access to the part of the transmission system situated downstream of the access control means, depending on the rate of arrival of incoming packets, characterized by an error reporting device (4) for recording, processing and reporting the rate of arrival per packet type (vci) of those packets which are refused access to said downstream situated part by the access control means (2, 3), said error reporting device having inputs from a plurality of said virtual channels via a read-out and set device (1) and from said access control means (2, 3) and having outputs for providing an error message for further processing thereof or to supply said message to means (5) for converting it into intelligible visible form.

2. Transmission system according to claim 1, characterized in that the error reporting device (4), for reporting said rate of arrival per packet type, delivers an error signal (c4) to means for enabling or disabling the entry of at least a packet type identification into an error memory as soon as the rate of arrival of packets of the same packet type which are not refused access to said downstream situated part of the transmission system exceeds a predetermined arrival rate threshold value for said same type of packets.

3. Transmission system according to claim 2, characterized in that the error reporting device (4) ceases to respond to the arrival of packets of each packet type for the arrival rate of which said predetermined threshold value is exceeded.

4. Transmission system according to claim 1, characterized in that the error reporting device (4) comprises a first recording device (5, S1, S2; 9) for recording under the control of setting control means (1) and said access control means (2, 3), the packet types of the packets which are refused access to the downstream part of said transmission system insofar as such a packet type has not already been recorded in said first recording device, and for delivering a signal (vci) after such a recording to the control means for response by said setting control means to prevent multiple recording of said packet type in said first recording device.

5. Transmission system according to claim 1, characterized in that the error reporting device (4) comprises at least one rate of packet arrival measuring device containing at least one counting device (6, S3, S4; 10) for maintaining, under the control of the setting control means (7) and the access control means (2, 3), for each packet type, a counter value which is altered in a particular direction if a packet of the same packet type is refused access to said downstream situated part of said transmission system by the access control means and which is altered in the opposite direction in proportion to lapse of time.

6. Transmission system according to claim 5, characterized in that, if a packet is refused access to the downstream situated part of said transmission system, said of least one counting device (6, S3, S4, 10) compares the counter value for the type of said refused packet with a threshold value and emits a signal (c4) if said threshold value is exceeded.

7. Transmission system according to claim 6, characterized in that said access control means (3, 2) includes an access counter-and-threshold device which is a "leaky bucket" type of device.

8. Transmission system according to claim 6, characterized in that the error reporting device (4) comprises a second recording device (8, S5, S6; 11) for recording, under the control of said at least one counting device (6, S3, S4; 10) and of the setting control means (7), the packet type of packets which cause the threshold value for their packet type to be exceeded, insofar as the same packet type has not already been recorded in said second recording device, and for emitting, after a recording in said second recording device, a signal (vci) to the setting control means for response by said setting control means to prevent multiple recording of said same packet type in the second recording device.

9. Transmission system according to claim 6, characterized in that said at least one counting device (6, S3, S4; 10) is used in a time-shared manner in which the last count and its time is stored in a memory for each of a plurality of packet types and upon refusal of access to said downstream part of said transmission system of a packet of one type, that count and parameters for alteration of that count established for that one type are loaded into said counter and after alteration of that count the resulting count replaces in said memory the previously stored count for that packet type, if a newly arrived packet is refused access to said downstream part of said transmission system by the access control means (2, 3), said setting control means (7) will set, in the counting device, before count alteration the last counter value associated with and stored under the packet type (vci) of that refused packet.

* * * * *